(12) United States Patent
Watanabe et al.

(10) Patent No.: US 9,846,356 B2
(45) Date of Patent: Dec. 19, 2017

(54) FILM FOR TRANSPARENT SCREEN AND METHOD FOR MANUFACTURE THEREOF, AND TRANSPARENT SCREEN COMPRISING SAME

(71) Applicants: TOKYO INSTITUTE OF TECHNOLOGY, Tokyo (JP); JX NIPPON OIL & ENERGY CORPORATION, Tokyo (JP)

(72) Inventors: Junji Watanabe, Tokyo-to (JP); Koichi Sakajiri, Tokyo-to (JP); Kousuke Yamaki, Tokyo-to (JP); Suzushi Nishimura, Tokyo-to (JP); Akira Matsuo, Tokyo-to (JP)

(73) Assignees: TOKYO INSTITUTE OF TECHNOLOGY, Tokyo (JP); JX NIPPON OIL & ENERGY CORPORATION, Tokyo (JP)

( * ) Notice: Subject to any disclaimer, the term of this patent is extended or adjusted under 35 U.S.C. 154(b) by 0 days.

(21) Appl. No.: 15/303,911

(22) PCT Filed: Apr. 10, 2015

(86) PCT No.: PCT/JP2015/061276
§ 371 (c)(1),
(2) Date: Oct. 13, 2016

(87) PCT Pub. No.: WO2015/159829
PCT Pub. Date: Oct. 22, 2015

(65) Prior Publication Data
US 2017/0059982 A1    Mar. 2, 2017

(30) Foreign Application Priority Data

Apr. 14, 2014 (JP) ................................ 2014-082965
Jul. 4, 2014 (JP) ................................ 2014-138824

(51) Int. Cl.
G03B 21/62    (2014.01)
G02B 5/02    (2006.01)
(Continued)

(52) U.S. Cl.
CPC .............. G03B 21/62 (2013.01); B32B 5/16 (2013.01); B32B 27/14 (2013.01); C08K 3/08 (2013.01);
(Continued)

(58) Field of Classification Search
CPC ........ G03B 21/56; G03B 21/62; G02B 5/0242
(Continued)

(56) References Cited

U.S. PATENT DOCUMENTS 8,372,505 B2    2/2013 Etori et al.
2006/0176553 A1    8/2006 Bertin-Mourot et al.
(Continued)

FOREIGN PATENT DOCUMENTS

JP    2001-281416    10/2001
JP    2005-99675    4/2005
(Continued)

OTHER PUBLICATIONS

International Preliminary Report on Patentability dated Oct. 18, 2016 in corresponding International Application No. PCT/JP2015/061276.
(Continued)

*Primary Examiner* — Christopher Mahoney
(74) *Attorney, Agent, or Firm* — Wenderoth, Lind & Ponack, L.L.P.

(57) ABSTRACT

Provided is a film for a transparent screen which can clearly display merchandise information, advertisement, or the like on a transparent partition or the like by projection without compromising the transmission visibility. A film for a transparent screen according to the present invention includes: a
(Continued)

resin layer; and inorganic particles at least a portion of which is contained in an aggregated state in the resin layer, wherein primary particles of the inorganic particles have a median diameter of 0.1 to 50 nm and a maximum particle size of 10 to 500 nm, and the content of the inorganic particles is 0.015 to 1.2% by mass with respect to the resin.

17 Claims, 2 Drawing Sheets

(51) Int. Cl.
| | |
|---|---|
| *G03B 21/60* | (2014.01) |
| *H04N 5/74* | (2006.01) |
| *B32B 5/16* | (2006.01) |
| *B32B 27/14* | (2006.01) |
| *C08K 3/08* | (2006.01) |
| *C08K 3/22* | (2006.01) |
| *C08K 3/30* | (2006.01) |
| *C09D 5/00* | (2006.01) |
| *C09D 101/12* | (2006.01) |
| *C09D 123/12* | (2006.01) |
| *C09D 125/06* | (2006.01) |
| *C09D 129/14* | (2006.01) |
| *C09D 133/12* | (2006.01) |
| *C09D 145/00* | (2006.01) |
| *C09D 167/02* | (2006.01) |
| *C09D 169/00* | (2006.01) |
| *G09F 19/18* | (2006.01) |

(52) U.S. Cl.
CPC .................. *C08K 3/22* (2013.01); *C08K 3/30* (2013.01); *C09D 5/006* (2013.01); *C09D 101/12* (2013.01); *C09D 123/12* (2013.01); *C09D 125/06* (2013.01); *C09D 129/14* (2013.01); *C09D 133/12* (2013.01); *C09D 145/00* (2013.01); *C09D 167/02* (2013.01); *C09D 169/00* (2013.01); *G02B 5/02* (2013.01); *G02B 5/0242* (2013.01); *G02B 5/0268* (2013.01); *G03B 21/60* (2013.01); *G09F 19/18* (2013.01); *H04N 5/74* (2013.01); *B32B 2264/10* (2013.01); *B32B 2264/105* (2013.01); *B32B 2307/412* (2013.01); *C08K 2003/0806* (2013.01); *C08K 2003/2206* (2013.01); *C08K 2003/2213* (2013.01); *C08K 2003/2237* (2013.01); *C08K 2003/2244* (2013.01); *C08K 2003/3045* (2013.01); *C08K 2201/003* (2013.01); *C08K 2201/005* (2013.01); *C08K 2201/011* (2013.01)

(58) Field of Classification Search
USPC ........................................................ 359/453
See application file for complete search history.

(56) References Cited

U.S. PATENT DOCUMENTS

| | | | |
|---|---|---|---|
| 2006/0209403 A1* | 9/2006 | Parusel | G02B 5/0221 359/453 |
| 2007/0053062 A1 | 3/2007 | Sasaki et al. | |
| 2011/0002036 A1* | 1/2011 | Perotti | G03B 21/60 359/453 |
| 2011/0195239 A1* | 8/2011 | Takane | B29D 11/00865 428/206 |
| 2014/0003060 A1* | 1/2014 | Okada | C08K 5/3417 362/311.02 |
| 2015/0153639 A1* | 6/2015 | Tokunaga | G03B 21/62 359/453 |
| 2016/0103254 A1* | 4/2016 | Dai | G02B 5/0242 362/606 |

FOREIGN PATENT DOCUMENTS

| | | |
|---|---|---|
| JP | 2006-91469 | 4/2006 |
| JP | 2006-131713 | 5/2006 |
| JP | 2006-146019 | 6/2006 |
| JP | 2006-518477 | 8/2006 |
| JP | 2007-65522 | 3/2007 |
| JP | 2007-240686 | 9/2007 |
| JP | 2008-112040 | 5/2008 |
| JP | 2010-138270 | 6/2010 |
| JP | 4571691 | 10/2010 |
| JP | 2011-113068 | 6/2011 |
| JP | 2013-182141 | 9/2013 |

OTHER PUBLICATIONS

International Search Report dated Jul. 7, 2015 in corresponding International Application No. PCT/JP2015/061276.
Notification of Reasons for Refusal dated Dec. 2, 2014 in corresponding Japanese Application No. 2014-138844, with English translation.

* cited by examiner

FILM FOR TRANSPARENT SCREEN AND METHOD FOR MANUFACTURE THEREOF, AND TRANSPARENT SCREEN COMPRISING SAME

TECHNICAL FIELD

The present invention relates to a film for a highly transparent projection type image display screen (hereinafter, referred to as "a film for a transparent screen"). The present invention also relates to a method for manufacturing the film for a transparent screen and a transparent screen comprising the film.

BACKGROUND ART

Conventionally, a combination of a Fresnel lens sheet and a lenticular lens sheet has been used for a projector screen. In recent years, a demand for displaying merchandise information, advertisement, or the like by projection on a show window of a department store or the like, a transparent partition of an event venue, or the like while maintaining the transparency thereof is growing. It is said that, in the future, a demand for a highly transparent projection type image display screen which is used for a head-up display, a wearable display, or the like will be further increasing.

However, since a conventional projector screen has a low transparency, there is a technical problem that such a projector screen cannot be applied to a transparent partition, or the like. Accordingly, as a projector screen, a screen having a recess on its surface is proposed (see Patent Document 1). A transmission type screen comprising a transparent thin film layer including diamond microparticles having a median diameter of 0.01 to 1 µm obtained by subjecting nanodiamond having a graphite phase obtained by an exposure method to an oxidation treatment is proposed (see Patent Document 2). Further, a film for a highly transparent reflection type screen composed of a polymer film composed of a matrix phase and a disperse phase containing a thermoplastic resin is proposed (see Patent Document 3).

In order to prevent a reflection on the surface of a variety of screens such as a transmission type screen or a reflection type screen, it is proposed that an antiglare member having an antiglare layer composed of black microparticles and a transparent binder is disposed on the surface of such screens (see Patent Document 4). Further, in order to prevent a decrease in the contrast, it is proposed to provide a transmission type screen on which a condenser is provided (Patent Document 5). Still further, it is proposed to provide a reflection type screen comprising a substrate, an optical absorbing layer, an optical multilayer film, and an optical diffusion layer in the order mentioned (see Patent Document 6).

RELATED ART DOCUMENTS

Patent Documents

Patent Document 1 Japanese Unexamined Patent Application Publication No. 2006-146019
Patent Document 2 Japanese Unexamined Patent Application Publication No. 2011-113068
Patent Document 3 Japanese Unexamined Patent Application Publication No. 2008-112040
Patent Document 4 U.S. Pat. No. 4,571,691
Patent Document 5 Japanese Unexamined Patent Application Publication No. 2007-240686
Patent Document 6 Japanese Unexamined Patent Application Publication No. 2005-99675

SUMMARY OF THE INVENTION

Problems to be Solved by the Invention

However, the present inventors found the following technical problems in Patent Documents 1 to 6. When a screen described in Patent Document 1 is applied to a transparent partition or the like of a show window or an event venue, there is a technical problem that the screen cannot maintain the performance for a long period of time since the concavoconvex portion wears with its usage. There is also a technical problem that a film clouds and the transparency is compromised since the diameter of optical diffusion particles is 1 to 20 µm. Nanodiamond particles used for a transparent screen described in Patent Document 2 have a technical problem that many treatment processes are required, resulting in reduced production efficiency or deteriorated production cost. A screen described in Patent Document 3 is obtained by stretching in at least one direction in order to exhibit the anisotropy of refraction. However, the stretching for exhibiting the anisotropy of refraction has a technical problem that the property in a direction perpendicular to a drawing direction may be nonuniform, and a further improvement is desired. A screen described in Patent Document 4 has a technical problem that the transparency is poor and the screen is grayish due to an influence of a carbon black since the screen comprises an antiglare member including black microparticles such as a carbon black having an average particle size of 1 to 6 µm. There is a technical problem that the transparency is significantly compromised since a transmission type screen described in Patent Document 5 comprises a condenser. A reflection type screen described in Patent Document 6 comprises an optical multilayer film formed by layering a low refractive index layer made of a fluorine resin and a high refractive index layer containing a metal oxide, and there is a technical problem that a light reflects on the interface of these layers, which compromises the transparency.

Means for Solving the Problems

The present invention has been made in view of the above-described technical problems, and an object of the present invention is to provide a film for a transparent screen which can clearly display merchandise information, advertisement, or the like on a transparent partition or the like by projection without compromising the transmission visibility. An object of the present invention is to provide a method for manufacturing the film for a transparent screen, and a transparent screen comprising the film.

In order to solve the above described technical problems, the present inventors intensively studied to find that the above described technical problems can be solved by adding a small amount of inorganic particles having the median diameter and the maximum particle size of primary particles in specified ranges to a resin layer. The present invention has been completed based on such findings.

That is, according to one aspect of the present invention, provided is a film for a transparent screen comprising:
a resin layer; and
inorganic particles at least a portion of which is contained in an aggregated state in the resin layer, wherein primary particles of the inorganic particles have a median diameter of 0.1 to 50 nm and a maximum particle size of 10 to 500 nm, and the content of the inorganic particles is 0.015 to 1.2% by mass with respect to the resin.

According to one aspect of the present invention, preferably, the inorganic particles are metal particles.

According to one aspect of the present invention, preferably, the inorganic particles are at least one selected from the group consisting of zirconium oxide particles, titanium oxide particles, cerium oxide particles, barium titanate particles, barium sulfate particles, and silver particles.

According to one aspect of the present invention, preferably, the resin layer comprises a thermoplastic resin.

According to one aspect of the present invention, preferably, the thermoplastic resin comprises at least one selected from the group consisting of an acrylic resin, a polyester resin, a polyolefin resin, a cellulose resin, a vinyl resin, a polycarbonate resin, and a polystyrene resin.

According to one aspect of the present invention, preferably, the thermoplastic resin comprises at least one selected from the group consisting of a polymethyl methacrylate resin, a polyethylene terephthalate resin, a polyethylene naphthalate resin, a polypropylene resin, a cycloolefin polymer resin, a cellulose acetate propionate resin, a polyvinyl butyral resin, a polycarbonate resin, and a polystyrene resin.

According to one aspect of the present invention, preferably, the total light transmittance of the film for a transparent screen is 70% or higher, and the haze value thereof is from 1.3% to 35%.

According to one aspect of the present invention, preferably, the image clarity of the film for a transparent screen is 70% or higher.

According to one aspect of the present invention, preferably, the thickness of the resin layer is from 20 to 400 μm.

In another aspect of the present invention, provided is a transparent screen comprising the film for a transparent screen described above.

In another aspect of the present invention, provided is a layered body comprising the transparent screen described above.

In another aspect of the present invention, provided is a member for a vehicle comprising the transparent screen described above.

In another aspect of the present invention, provided is a member for a house comprising the transparent screen described above.

In another aspect of the present invention, provided is an image projection device comprising the transparent screen described above and a projection device.

In still another aspect of the present invention, provided is a method for manufacturing the film for a transparent screen described above, comprising:

a step of kneading the resin and the inorganic particles by using a twin-screw kneading extruder while applying a shear stress of 3 to 1,800 kPa on average over the whole length of a screw of the twin-screw kneading extruder to obtain a resin composition; and a step of forming a film made of the resin composition, wherein the twin-screw kneading extruder comprises a flight screw including at least one mixing and kneading element selected from the group consisting of a kneading element, a mixing element, and a rotary element.

In still another aspect of the present invention, preferably, the twin-screw kneading extruder comprises a flight screw including at least one mixing and kneading element selected from the group consisting of a kneading element, a mixing element, and a rotary element.

In still another aspect of the present invention, provided is a method for manufacturing the film for a transparent screen described above, comprising:

a step of mixing the inorganic particles and the resin to obtain an inorganic particle-attached resin composition;

a step of kneading the inorganic particle-attached resin composition and the resin to obtain an inorganic particle-dispersed resin composition; and a step of forming a film made of the inorganic particle-dispersed resin composition.

In still another aspect of the present invention, preferably, the step of kneading and/or the step of forming a film are performed by using a single- or twin-screw kneading extruder.

Effects of the Invention

According to the present invention, a film for a transparent screen which can clearly display merchandise information, advertisement, or the like on a transparent partition or the like by projection without compromising the transmission visibility can be provided. Since such a film for a transparent screen has excellent transparency or image clarity, it can be suitably used as a transparent screen. Further, a transparent screen comprising the film can be provided, and can be suitably used for a windshield or side glass of a vehicle, a window glass for housing, or the like.

MODE FOR CARRYING OUT THE INVENTION

Film for Transparent Screen

A film for a transparent screen according to the present invention comprises a resin layer and inorganic particles at least a portion of which is contained in an aggregated state. The film can be suitably used as a film to be stuck to a transparent partition, a glass for a vehicle, a glass for housing, or the like, and such a transparent partition, a glass for a vehicle, a glass for housing, or the like can be suitably used as a transparent screen. Since it is demanded that the transmission visibility of a transparent screen such as a transparent partition, a glass for a vehicle, or a glass for housing be not compromised, preferably, the transmittance of a film for a transparent screen for a visible light is high and the transparency thereof is high. In the present invention, the term "transparent" includes "translucent" which can attain a transmission visibility depending on applications.

The total light transmittance of a film for a transparent screen is preferably 70% or higher, more preferably 75% or higher, further preferably 80% or higher, and still more preferably 85% or higher, and the haze value thereof is preferably from 1.3% to less than 35%, and more preferably from 1.5% to less than 30%. Further, the parallel light transmittance of a film for a transparent screen is preferably 60% or higher, more preferably 65% or higher. When the total light transmittance, the parallel light transmittance, and the haze value of the film is in the above-described ranges, the transmission visibility can be further improved. In the present invention, the total light transmittance, the parallel light transmittance, and the haze value of a film for a transparent screen can be measured by using a haze meter (manufactured by NIPPON DENSHOKU INDUSTRIES CO., LTD., trade name: NDH-5000) in accordance with JIS-K-7361 and JIS-K-7136.

The image clarity of a film for a transparent screen is preferably 70% or higher, more preferably 75% or higher, further preferably 80% or higher, still more preferably 85% or higher, and particularly preferably 90% or higher. When the image clarity of the film for a transparent screen is in the above-described range, an image appeared through such a transparent screen is considerably clear. In the present invention, the image clarity is a value of definition (%) when measured with an optical comb having a width of 0.125 mm in accordance with JIS K7374.

Figure 1:
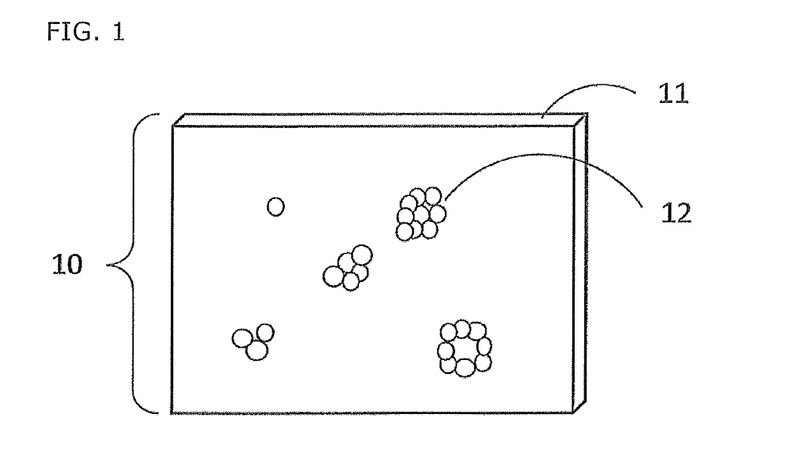
FIG. 1 is a schematic diagram illustrating one embodiment of a film for a transparent screen according to the present invention.
Figure 2:
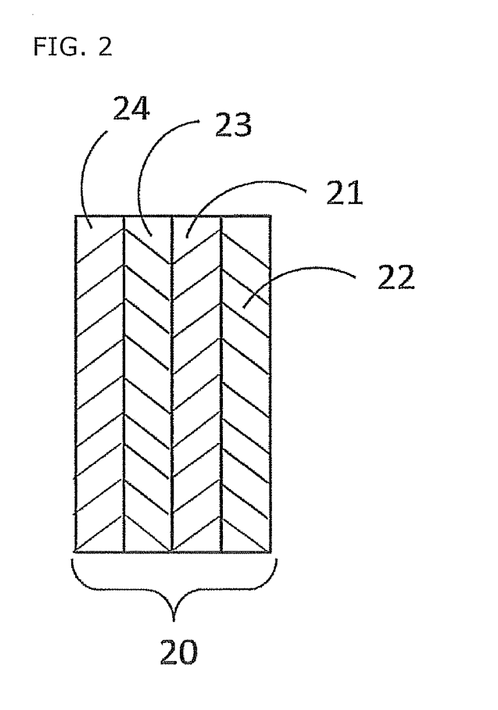
FIG. 2 is a cross-sectional view in the thickness direction of one embodiment of a film for a transparent screen according to the present invention.

FIG. 1 is a schematic diagram illustrating one embodiment of a film for a transparent screen according to the present invention. A film for a transparent screen 10 comprises a resin layer 11 and inorganic particles 12 at least a portion of which is present in the resin layer 11 in an aggregated state. The film for a transparent screen may have a monolayer configuration composed of a resin layer or may have a layered body configuration having a plurality of layers further comprising a protection layer, a backing layer, and an adhesive layer. FIG. 2 is a cross-sectional view in the thickness direction of one embodiment of a film for a transparent screen having such a configuration of a plurality of layers. In a film for a transparent screen 20, a resin layer 21 is layered on one surface of a backing layer 23, and a protection layer 22 is further layered on the resin layer 21. An adhesive layer 24 is layered on the other surface (the surface opposite to the resin layer 21) of the backing layer 23. In the following, configurations of the film for a transparent screen will be described in detail.

(Resin Layer)

For a resin layer, a highly transparent resin is preferably used in order to obtain a highly transparent film. For a highly transparent resin, a thermoplastic resin, a thermoset resin, an ionizing radiation-curable resin, and the like can be used. Examples of the highly transparent resin include an acrylic resin, an acrylic urethane resin, a polyester acrylate resin, a polyurethane acrylate resin, an epoxy acrylate resin, a polyester resin, a polyolefin resin, a urethane resin, an epoxy resin, a polycarbonate resin, a cellulose resin, an acetal resin, a vinyl resin, a polystyrene resin, a polyamide resin, a polyimide resin, a melamine resin, a phenol resin, a silicone resin, and a fluorocarbon resin.

Among the above, a thermoplastic resin is preferably used from the viewpoint of the formability of a film. In particular, among thermoplastic resins, preferably, an acrylic resin, a polyester resin, a polyolefin resin, a cellulose resin, a vinyl resin, a polycarbonate resin, and a polystyrene resin are used, and more preferably, a polymethyl methacrylate resin, a polyethylene terephthalate resin, a polyethylene naphthalate resin, a polypropylene resin, a cycloolefin polymer resin, a cellulose acetate propionate resin, a polyvinyl butyral resin, a polycarbonate resin, and a polystyrene resin are used. These resins may be used singly, or in combination of two or more kinds thereof.

Examples of the ionizing radiation-curable resin include an acrylic resin, a urethane resin, an acrylic urethane resin, an epoxy resin, and a silicone resin. Among these, those having an acrylate functional group, for example, those containing a relatively large amount of a monofunctional monomer such as ethyl (meth)acrylate, ethylhexyl (meth)acrylate, styrene, methyl styrene, N-vinylpyrrolidone and a polyfunctional monomer, such as polymethylolpropane tri (meth)acrylate, hexane diol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexane diol di(meth)acrylate, neopentyl glycol di(meth)acrylate as an oligomer or a prepolymer of a polyester resin, a polyether resin, an acrylic resin, an epoxy resin, a urethane resin, an alkyd resin, a spiroacetal resin, a polybutadiene resin, a polythiol polyene resin, a (meth) acrylate of a polyfunctional compound such as a polyalcohol and a reactivity diluent having a relatively low molecular weight are preferable. The ionizing radiation-curable resin may be obtained by mixing a thermoplastic resin and a solvent.

Examples of the thermoset resin includes a phenol resin, an epoxy resin, a silicone resin, a melamine resin, a urethane resin, and a urea resin. Among these, an epoxy resin and a silicone resin are preferable.

The thickness of the resin layer is not particularly restricted, and from the viewpoint of the formability, the handleability, and the conveyability of a film, the thickness is preferably from 20 to 400 μm, and more preferably from 50 to 300 μm when the resin layer is a monolayer. When the thickness of the resin layer is in the above-described range, the strength of the film is likely to be maintained and the film is likely to be wound in a manufacturing process. The film may be a layered body in which two or more resin layers are layered, and the thickness of the layered body is preferably from 40 μm to 10 m.

(Inorganic Particle)

At least a portion of inorganic particles are contained in the resin layer in an aggregated state. An aggregated state is a state in which, for example, a plurality of, preferably from 2 to about 20, and more preferably from 3 to about 15 primary particles of the inorganic particles in the resin layer are aggregated and bonded to each other. For example, such inorganic particles are aggregated in a shape of a bunch of grave or a pearl necklace.

The primary particles of the inorganic particles have a median diameter ($D_{50}$) of from 0.1 to 50 nm, preferably from 0.5 to 40 nm, more preferably from 1 to 35 nm, and further preferably from 1.5 to 30 nm, and have a maximum particle size of from 10 to 500 nm, preferably from 15 to 300 nm, more preferably from 20 to 200 nm, and further preferably from 20 to 130 nm. With the median diameter and the maximum particle size of the primary particles of the inorganic particles in the above-described ranges, when a film is used as a film for a transparent screen, an effect of sufficiently scattering a projection light without compromising the transmission visibility is obtained, thereby displaying merchandise information, advertisement, or the like on a transparent partition or the like by projection. In the present invention, the median diameter ($D_{50}$) and the maximum particle size of the primary particles of the inorganic particles can be determined from a particle size distribution measured using a particle size distribution measurement apparatus (manufactured by Otsuka Electronics Co., Ltd., trade name: DLS-8000) by a dynamic light scattering method.

The content of the inorganic particles in the resin layer is, with respect to the resin, from 0.015 to 1.2% by mass, preferably from 0.02 to 1.1% by mass, more preferably from 0.05 to 1.0% by mass, and further preferably from 0.1 to 0.8% by mass. With the content of the inorganic particles in the resin layer in the above-described range, when the film is used as a film for a transparent screen, an effect of sufficiently scattering a projection light without compromising the transmission visibility is obtained, thereby displaying information, advertisement, an image, or the like on a transparent partition, a glass for a vehicle, a glass for housing or the like by projection.

In the present invention, at least a portion of inorganic particles is contained in a resin layer in an aggregated state, whereby a projection light forms an image on the film. Assuming that inorganic particles are not aggregated at all and are dispersed as primary particles themselves, an effect of sufficiently scattering a projection light is not obtained, and an image is less likely to be formed on the film. When the median diameter of the inorganic particles is from several hundreds nm to several μm, or the maximum particle size is several μm, the film clouds, and a formed image becomes unclear. Further, when the content of inorganic particles is 1.5% by mass or more, the film clouds, and a formed image becomes unclear. On the other hand, when the content of inorganic particles is 0.01% by mass or less, an effect of sufficiently scattering a projection light is not obtained, and an image is less likely to be formed on the film. Therefore, in the present invention, when a resin layer constituting the film contains a specific amount of inorganic particles having a median diameter and a maximum particle size in specified ranges, an effect of sufficiently scattering a projection light without compromising the transmission visibility can be obtained. For this reason, the surface of the film according to the present invention needs not be subjected to a post-treatment such as a molding treatment in order to obtain an effect of sufficiently scattering a projection light, and the film according to the present invention is excellent from the viewpoint of the manufacturing cost.

For inorganic particles, an inorganic matter which can be atomized in a nano size may be used. As the inorganic particles, preferably, inorganic particles excepting carbon particles, and more preferably metal particles are used. Here, carbon particles refer to microparticles having carbon such as carbon black or diamond particles as a main component. For metal particles, those obtained by pulverizing a metal oxide or a substance other than metal oxide are used. Examples of the metal oxide include zirconium oxide, titanium oxide, oxidation zinc, oxidation aluminum, and cerium oxide. Examples of the substance other than metal oxide include an alloy such as barium titanate, a pure metal such as silver, gold, platinum, and palladium, and barium sulfate. In particular, from the viewpoints of scattering property of a projection light, the aggregability of particles, and the manufacturing cost, zirconium oxide particles, titanium oxide particles, cerium oxide particles, barium titanate particles, barium sulfate particles, and silver particles are preferably used. Further, from the viewpoint of the image clarity, zirconium oxide particles, titanium oxide particles, cerium oxide particles, and barium titanate particles are more preferably used. By using such specific metal particles, the image clarity of a film for a transparent screen is improved, and an image appeared through a transparent screen is considerably clear. These inorganic particles may be used singly or in combination of two or more kinds thereof.

For the inorganic particles, commercially available inorganic particles may be used, and for the zirconium oxide particles, SZR-W, SZR-CW, SZR-M, SZR-K, and the like (the above, manufactured by SAKAI CHEMICAL INDUSTRY CO., LTD., trade name) can be suitably used.

To the resin layer, conventionally known additives may be added in addition to the inorganic particles depending on applications. Examples of the additives include an antioxidant, an ultraviolet absorber, a light stabilizer, an antistatic agent, a release agent, a flame retardant, a plasticizer, a lubricant, and a color material. As the color material, a pigment or dye such as carbon black, azo pigment, anthraquinone pigment, or perinone pigment can be used. A liquid crystalline compound or the like may be mixed thereto.

(Backing Layer)

A backing layer is a layer for supporting a resin layer described above, which can improve the strength of a film for a transparent screen. A backing layer is preferably formed by using a highly transparent material such as a glass or a resin, which does not compromise the transmission visibility or the desired optical property of a film for a transparent screen. For such a resin, a highly transparent resin similar to the resin layer described above can be used. A composite film or sheet formed by layering two or more resin described above may be used. The thickness of the backing layer can be appropriately changed depending on the type of the material so that the strength thereof is suitable, and the thickness may be, for example, in the range of from 10 to 1000 μm.

(Protection Layer)

A protection layer is layered on the front side (observer side) of a film for a transparent screen, and is a layer for imparting a function such as a light resistance, a scratch resistance, and a stain resistance. The protection layer is preferably formed by using a resin which does not compromise the transmission visibility or the desired optical property of a film for a transparent screen. For such a resin, for example, a resin cured by an ultraviolet light or electron ray, i.e., an ionizing radiation-curable resin, a mixture obtained by adding a thermoplastic resin and a solvent to an radiation curable resin, and a heat setting resin. Among these, an ionizing radiation-curable resin is particularly preferable.

For a film forming component of the ionizing radiation-curable resin composition, preferably, those having an acrylate functional group, for example, those containing a relatively large amount of a monofunctional monomer such as ethyl (meth)acrylate, ethylhexyl (meth)acrylate, styrene, methyl styrene, N-vinylpyrrolidone and a polyfunctional monomer, such as polymethylolpropane tri(meth)acrylate, hexane diol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexane diol di(meth)acrylate, neopentyl glycol di(meth)acrylate as an oligomer or a prepolymer of a polyester resin, a polyether resin, an acrylic resin, an epoxy resin, a urethane resin, an alkyd resin, a spiroacetal resin, a polybutadiene resin, a polythiol polyene resin, a (meth)acrylate of a polyfunctional compound such as a polyalcohol and a reactivity diluent having a relatively low molecular weight can be used.

In order to make the above-described ionizing radiation-curable resin composition an ultraviolet light curable resin composition, acetophenones, benzophenons, Michler's benzoyl benzoates, α-amidoxime esters, tetramethyl thiuram monosulfides, and thioxanthones as photopolymerization initiators, and n-butyl amine, triethylamine, and poly-n-butylphosphine as photosensitizers may be added thereto to be used. In particular, in the present invention, a urethane acrylate as an oligomer and a dipentaerythritol hexa(meth) acrylate or the like as a monomer are preferably mixed.

An ionizing radiation-curable resin composition can be cured by irradiation of an electron beam or an ultraviolet light using a normal curing method as a curing method. For example, in the case of electron beam curing, an electron beam having an energy of 50 to 1000 KeV, and preferably 100 to 300 KeV released from a variety of electron beam accelerators such as Cockcroft-Walton-type, Van de Graaff-type, resonance transformer-type, insulating core transformer-type, linear-type, Dynamitron-type, and high-frequency-type is used, and in the case of ultraviolet light curing, a ultraviolet light or the like emitted from a light beam such as an ultra-high pressure mercury lamp, a high pressure mercury lamp, a low pressure mercury lamp, a carbon arc, a xenon arc, and a metal halide lamp can be used.

A protection layer can be formed by apply a coating of the above-described ionizing radiation (ultraviolet light)-curable resin composition on the surface of the above-described resin layer by a method such as spin coating, die coating, dip coating, bar coating, flow coating, roll coating, or gravure coating, and by curing the coating by the above-described means. To the surface of the protection layer, a microstructure such as a concavoconvex structure, a prism structure, or a microlens structure can also be provided depending on the purposes.

(Adhesive Layer)

An adhesive layer is a layer for sticking a film to a transparent screen. The adhesive layer is preferably formed by using an adhesive composition which does not compromise the transmission visibility or the desired optical property of a film for a transparent screen. Examples of the adhesive composition include a natural rubber, a synthetic rubber, an acryl resin, a polyvinyl ether resin, a urethane resin, and a silicone resin. Specific examples of the synthetic rubber include a styrene-butadiene rubber, an acrylonitrile-butadiene rubber, a polyisobutylene rubber, an isobutylene-isoprene rubber, a styrene-isoprene block copolymer, a styrene-butadiene block copolymer, and a styrene-ethylene-butylene block copolymer. Specific examples of the silicone resin include a dimethyl polysiloxane. These adhesives can be used singly or in combination of two or more kinds thereof. Among these, an acrylic adhesive is preferable.

An acrylic resin adhesive at least includes an alkyl (meth)acrylate monomer and is formed by polymerization. Copolymerization of an alkyl (meth)acrylate monomer having an alkyl group having the number of carbon atoms of 1 to about 18 and a monomer having a carboxyl group is usually employed. A (meth)acrylic acid means an acrylic acid and/or a methacrylic acid. Examples of the alkyl (meth)acrylate monomer include methyl (meth)acrylate, ethyl (meth)acrylate, n-propyl (meth)acrylate, sec-propyl (meth)acrylate, n-butyl (meth)acrylate, sec-butyl (meth) acrylate, tert-butyl (meth)acrylate, isoamyl (meth)acrylate, n-hexyl (meth)acrylate, cyclohexyl (meth)acrylate, n-octyl (meth)acrylate, isooctyl (meth)acrylate, 2-ethylhexyl (meth) acrylate, undecyl (meth)acrylate, and lauryl (meth)acrylate. The above-described alkyl (meth)acrylate is usually copolymerized at a ratio of 30 to 99.5 parts by mass in the acrylic adhesive.

Examples of the monomer having a carboxyl group forming an acrylic resin adhesive include a monomer containing a carboxyl group such as a (meth)acrylic acid, an itaconic acid, a crotonic acid, a maleic acid, a monobutyl maleate, and β-carboxy ethyl acrylate.

With the acrylic resin adhesive, a monomer having another functional group other than the above may be copolymerized as long as the property of the acrylic resin adhesive is not compromised. Examples of the monomer having another functional group include: a monomer having a functional group such as a monomer containing a hydroxyl group such as 2-hydroxyethyl (meth)acrylate, 2-hydroxy propyl (meth)acrylate, and allyl alcohol; a monomer containing an amide group such as (meth)acrylamide, N-methyl (meth)acrylamide, and N-ethyl (meth)acrylamide; a monomer containing a methylol group and an amide group such as N-methylol (meth)acrylamide and dimethylol (meth) acrylamide; a monomer containing an amino group such as aminomethyl (meth)acrylate, dimethylamino ethyl (meth) acrylate, and vinyl pyridine; a monomer containing an epoxy group such as allyl glycidyl ether, or (meth)acrylate glycidyl ether. Examples of the monomer having another functional group other than the above include fluorine substituted alkyl (meth)acrylate, (meth)acrylonitrile, an aromatic compound containing a vinyl group such as styrene and methyl styrene, vinyl acetate, a halogenated vinyl compound.

For the acrylic resin adhesive, other than the monomer having a functional group as described above, another monomer having an ethylenic double bond can be used. Examples of the monomer having an ethylenic double bond include a diester of an α,β-unsaturated dibasic acid such as dibutyl maleate, dioctyl maleate, or dibutyl fumarate; a vinyl ester such as vinyl acetate, vinyl propionate; vinyl ether; a vinyl aromatic compound such as styrene, α-methyl styrene, and vinyl toluene; and (meth)acrylonitrile. Other than the monomer having a ethylenic double bond as described above, a compound having two or more ethylenic double bonds may be used in combination. Examples of such a compound include divinylbenzene, diallyl maleate, diallyl phthalate, ethylene glycol di(meth)acrylate, trimethylol propane tri(meth)acrylate, and methylene bis(meth)acrylamide.

Further, other than the monomers as described above, a monomer having an alkoxy alkyl chain or the like can be used. Examples of the alkoxyalkyl (meth)acrylate include 2-methoxyethyl (meth)acrylate, methoxyethyl (meth)acrylate, 2-methoxypropyl (meth)acrylate, 3-methoxypropyl (meth)acrylate, 2-methoxybutyl (meth)acrylate, 4-methoxybutyl (meth)acrylate, 2-ethoxyethyl (meth)acrylate, 3-ethoxypropyl (meth)acrylate, and 4-ethoxybutyl (meth) acrylate.

As the adhesive composition, other than the above-described acrylic resin adhesive, a homopolymer of a alkyl (meth)acrylate monomer may also be used. Examples of the (meth)acrylate homopolymer include methyl poly(meth) acrylate, ethyl poly(meth)acrylate, propyl poly(meth)acrylate, butyl poly(meth)acrylate, and octyl poly(meth)acrylate. Examples of a copolymer containing two types of acrylic acid ester units include ethyl (meth)acrylate-methyl (meth) acrylate copolymer, butyl (meth)acrylate-methyl (meth) acrylate copolymer, 2-hydroxyethyl (meth)acrylate-methyl (meth)acrylate copolymer, and methyl (meth)acrylate-2-hydroxy 3-phenyloxypropyl (meth)acrylate copolymer. Examples of a copolymer of a (meth)acrylic ester and another functional monomer include a methyl (meth)acrylate-styrene copolymer, a methyl (meth)acrylate-ethylene copolymer, and a methyl (meth)acrylate-2-hydroxyethyl (meth)acrylate-styrene copolymer.

For the adhesive, a commercially available one may be used, and examples thereof include SK-Dyne 2094, SK-Dyne 2147, SK-Dyne 1811L, SK-Dyne 1442, SK-Dyne 1435, and SK-Dyne 1415 (manufactured by Soken Chemical & Engineering Co., Ltd.), Oribain EG-655, and Oribain BPS5896 (manufactured by TOYO INK CO., LTD.) or the like (trade name), which can be suitably used.

(Reflection Protection Layer)

A reflection protection layer is a layer for preventing a reflection or a reflection of an external light on the outermost surface of a film for a transparent screen or a layered body of such a film. The reflection protection layer may be layered on the front side (the observer side) of a film for a transparent screen or a layered body thereof or may be layered on both sides thereof. When such a film is used as a transparent screen, the reflection protection layer is particularly preferably layered on the observer side. The reflection protection layer is preferably formed by using a resin which does not compromise the transmission visibility or a desired optical property of a film for a transparent screen or a layered body thereof. For such a resin, for example, a resin cured by an ultraviolet light/electron beam, i.e., an ionizing radiation-curable resin, those obtained by adding a thermoplastic resin and a solvent to an ionizing radiation-curable resin, and a heat setting resin can be used. Among these, an ionizing radiation-curable resin is particularly preferable. To the surface of the reflection protection layer, a microstructure such as a concavoconvex structure, a prism structure, or a microlens structure can be imparted depending on the purposes.

A method of forming the reflection protection layer is not particularly restricted, and a dry coating method such as pasting of a coating film, or direct deposition or sputtering on a film substrate; and a wet coating treatment method such as gravure coating, microgravure coating, bar coating, slide die coating, slot die coating, and dip coating.

(Functional Layer)

A film for a transparent screen according to the present invention may comprise, other than the layers described above, a variety of conventionally known functional layers. Examples of the functional layer include a light absorbing layer containing a dye, a colorant, or the like, a optical diffusion layer such as a prism sheet, a microlens sheet, a Fresnel lens sheet, and a lenticular lens sheet, and light beam cut layer for an ultraviolet light and an infrared ray.

<Method for Manufacturing Film for Transparent Screen> a method for manufacturing a film for a transparent screen according to the present invention comprises a kneading process and a film manufacturing process, and can further comprise a layering process. In the following, each step of the manufacturing method will be described in detail.

(Kneading Process)

A kneading process is a process in which a resin and inorganic particles are kneaded by using a twin-screw kneading extruder while applying a shear stress of 3 to 1,800 kPa, preferably 6 to 1,400 kPa on average over the whole length of a screw of the twin-screw kneading extruder to obtain a resin composition. When the shear stress is in the above-described range, the inorganic particles can be sufficiently dispersed in the resin. In particular, when the shear stress is 3 kPa or higher, the dispersion homogeneity of the inorganic particles can be more improved, and when the shear stress is 1,800 kPa or lower, degradation of the resin is prevented, thereby preventing contamination of an air bubble. The shear stress can be set in a desired range by regulating a twin-screw kneading extruder. In the present invention, a resin (master batch) to which inorganic particles are added in advance and a resin to which inorganic particles are not added may be mixed together to be kneaded by a twin-screw kneading extruder, thereby obtaining a resin composition.

In a kneading process, after obtaining an inorganic particle-attached resin composition obtained by sufficiently uniformly mixing a resin and inorganic particles by a mixer, the inorganic particle-attached resin composition and a resin can also be kneaded by using a single- or twin-screw kneading extruder to obtain an inorganic particle-dispersed resin composition. As the mixer, a container revolution type mixer such as KRT series manufactured by KATO-RIKI MFG. CO., LTD., a revolution blade type mixer such as a ribbon type mixer manufactured by TOKUJU CORPORATION, or the like can be used. By using a resin composition sufficiently mixed by such a mixer, generation of a large inorganic particle aggregation can be suppressed, and a single-screw extruder can be used. The screw shape of the single-screw kneading extruder and the shear stress are not particularly restricted, and a so-called full flight screw having a conveying element over the full length of the screw or a screw partially including a mixing and kneading element can also be used. In the present invention, a resin (master batch) to which inorganic particles are added in advance and a resin to which inorganic particles are not added may be mixed together to be kneaded by a single-screw kneading extruder, thereby obtaining a resin composition. A dispersing agent which is usually used may also be used.

To the resin composition, other than the resin and the inorganic particles, conventionally known additives may be added as long as the transmission visibility or a desired optical performance of a film for a transparent screen is not compromised. Examples of the additives include an antioxidant, a lubricant, an ultraviolet absorber, and a stabilizer. The resin and the inorganic particles are as described above.

A twin-screw kneading extruder used in the kneading process comprises a cylinder and two screws therein and is configured by combining screw elements. For the screw, a flight screw at least including a conveying element and a mixing and kneading element is suitably used. The mixing and kneading element preferably includes at least one selected from the group consisting of a kneading element, a mixing element, and a rotary element. By using such a flight screw including a mixing and kneading element, inorganic particles can be sufficiently dispersed in a resin while applying a desired shear stress.

The single-screw kneading extruder used in the kneading process comprises a cylinder and one screw therein, and the shape of the screw is not particularly restricted.

(Film Manufacturing Process)

A film manufacturing process is a process in which a film is made of a resin composition obtained in the kneading process. A film manufacturing method is not particularly restricted, and a film made of a resin composition can be made by a conventionally known method.

For example, a resin composition obtained in the kneading process is provided to a melt extruder heated to a temperature (Tm to Tm+70° C.) of the melting point of the resin composition or higher to melt the resin composition. For the melt extruder, a single-screw extruder, a twin-screw extruder, a vent extruder, or a tandem extruder can be used depending on the purposes.

Subsequently, the molten resin composition is, for example, extruded into a sheet shape by a die such as a T-die, and the extruded sheet is quenched and solidified by a revolving cooling drum or the like, thereby forming a flim. When a film manufacturing process is performed in continuation with the above-described kneading process, a resin composition obtained in the kneading process in a molten state can be directly extruded into a sheet shape by a die to form a film.

The film obtained in the film manufacturing process can be further uniaxially stretched or biaxially stretched by a conventionally known method. By stretching the film, the strength of the film can be improved.

(Layering Process)

A layering process is a process in which a backing layer, a protection layer, an adhesive layer, and the like are further layered on the resin film obtained in the film manufacturing process. The layering method for each layer is not particularly restricted, and a conventionally known method can be used. When each layer is layered by dry lamination, an adhesive or the like may be used as long as the transmission visibility or a desired optical property of the film for a transparent screen is not compromised.

<Transparent Screen>

The transparent screen according to the present invention comprises a film for a transparent screen described above. The transparent screen may be only compsed of a film for a transparent screen described above, or may further comprises a support such as a transparent partition.

The transparent screen may be a back projection screen (transmission type screen) or may be a front projection screen (reflection type screen). That is, in an image display apparatus comprising a transparent screen according to the present invention, a projection device (light source) may be positioned on the observer side with respect to the screen or may be positioned on the opposite side of the observer. The transparent screen may have a plane surface or a curved surface.

<Member for Vehicle>

A member for a vehicle according to the present invention comprises a transparent screen as described above. The member for a vehicle may be composed only of a transparent screen described above, or may be a layered body which further comprises a reflection protection layer or the like. Examples of the member for a vehicle include a windshield or a side glass. When the member for a vehicle comprises a transparent screen described above, a clear image can be displayed on a member for a vehicle without providing a separate screen.

<Member for House>

A member for a house according to the present invention comprises a transparent screen described above. The member for a house may be composed only of a transparent screen described above, or may be a layered body further comprising a reflection protection layer or the like. Examples of the member for a house include a window glass for a house, a glass wall for a convenient store or a shop along the street. When the member for a house comprises a transparent screen described above, a clear image can be displayed on a member for a house without providing a separate screen.

<Image Projection Device>

An image projection device according to the present invention comprises a transparent screen described above and a projection device. The projection device is not particularly restricted as long as the device can project an image on a screen, and for example, a commercially available rear projector or a front projector can be used.

Figure 3:
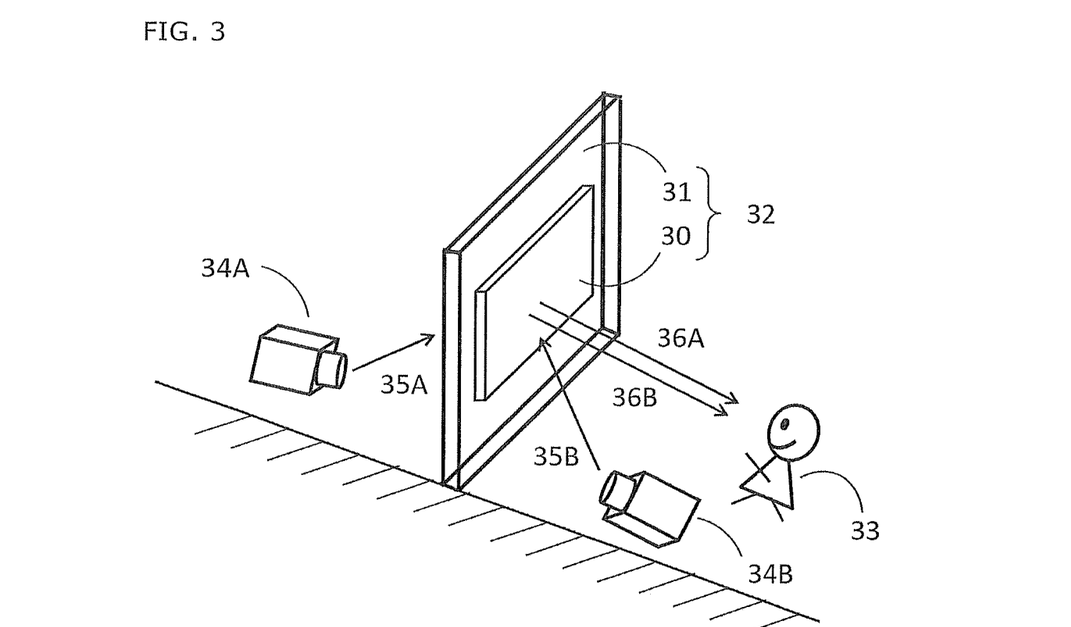
FIG. 3 is a schematic diagram illustrating one embodiment of a transparent screen and an image projection device according to the present invention.

FIG. 3 is a schematic diagram illustrating one embodiment of a transparent screen and an image projection device according to the present invention. A transparent screen 32 comprises a transparent partition 31 and a film for a transparent screen 30 on the observer 33 side of the transparent partition 31. Since the film for a transparent screen 30 is stuck to the transparent partition 31, the film preferably includes an adhesive layer. When the transparent screen 32 is a back projection screen, the image projection device comprises the transparent screen 32 and a projection device 34A provided on the opposite side (back side) of the observer 33 with respect to the transparent screen 32. A projection light 35A emitted from the projection device 34A enters from the back side of the transparent screen 32 and anisotropically diffuses by the transparent screen 32, whereby the observer 33 can visually recognize a diffused light 36A. On the other hand, when the transparent screen 32 is a front projection screen, the image projection device comprises the transparent screen 32 and a projection device 34B provided on the side (front side) of the observer 33 with respect to the transparent screen 32. A projection light 35B emitted from the projection device 34B enters from the front side of the transparent screen 32 and anisotropically diffuses by the transparent screen 32, whereby the observer 33 can visually recognize a diffused light 36B.

(Support)

A support is for supporting a film for a transparent screen. Any support may be used as long as the support does not compromise the transmission visibility or a desired optical property of the transparent screen, and examples thereof include a transparent partition, a glass window, a head-up display, and a wearable display.

EXAMPLES

In the following, the present invention will be more specifically described with reference to Examples and Comparative Examples, but the present invention should not be construed to be limited to the following Examples.

Manufacturing of Film for Transparent Screen

Example 1

1. Manufacturing of Thermoplastic Resin Pellet to which Inorganic Particles are Added First, for inorganic particles, a methanol dispersion ($ZrO_2$ concentration: 30% by mass, manufactured by SAKAI CHEMICAL INDUSTRY CO., LTD., trade name: SZR-M) of zirconium oxide ($ZrO_2$) particles was prepared. The particle size distribution of the $ZrO_2$ particles was measured by a dynamic light scattering method by using a particle size distribution measurement apparatus (manufactured by Otsuka Electronics Co., Ltd., trade name: DLS-8000), and as the result, the median diameter was 2 nm, and the maximum particle size was 23 nm. This dispersion was sprayed on a polymethyl methacrylate resin pellet (PMMA pellet) (manufactured by Mitsubishi Rayon Co., Ltd., trade name: ACRYPET VH) by using a sprayer, whereby $ZrO_2$ powder was uniformly adhered to the surface of the PMMA pellet. The PMMA pellet on which the $ZrO_2$ dispersion was sprayed was dried in a vacuum clean oven having a vacuum of 2 torr at 70° C. for 24 hours to obtain a $ZrO_2$ particle-added PMMA pellet. The mass of the obtained $ZrO_2$ particle-added PMMA pellet was measured, and as the result, the addition amount of the $ZrO_2$ particles was 1% by mass based on the PMMA pellet.

2. Manufacturing of Film (Kneading and Film Manufacturing Process)

The $ZrO_2$ particle-added PMMA pellet obtained in the above-described 1. was contained in a hopper of a twin-screw kneading extruder (manufactured by TECHNOVEL CORPORATION, trade name: KZW-30 MG) to manufacture a film (unstretched) having a thickness of 100 μm. The screw diameter of the twin-screw kneading extruder was 20 mm, and the screw effective length (L/D) was 30. A hanger coat-type T-die was placed on the twin-screw kneading extruder through an adapter. The extrusion temperature was 270° C., the number of screw revolution was 500 rpm, and the shear stress was 300 kPa. The used screw had the total length of 670 mm, comprised a mixing element in a portion between a position 160 mm and a position 185 mm from the hopper side of the screw and a kneading element in a portion between a position 185 mm and a position 285 mm from the hopper side of the screw, and other portions of the screw had a flight shape.

Example 2

In the above-described 2. (Manufacturing of Film), a PMMA pellet to which 1% by mass of $ZrO_2$ particle was added and a PMMA pellet to which $ZrO_2$ was not added were placed at a ratio of 50:50 in a plastic bag, and the plastic bag was sufficiently shaken to obtain a uniformly mixed pellet. A film was manufactured in a similar manner to Example 1 except that the mixed pellet was contained in the hopper of the twin-screw kneading extruder. The content of $ZrO_2$ particle in the obtained film was 0.5% by mass based on the mixed pellet.

Example 3

In the above-described 2. (Manufacturing of Film), a PMMA pellet to which 1% by mass of $ZrO_2$ particle was added and a PMMA pellet to which $ZrO_2$ was not added were placed at a ratio of 10:90 in a plastic bag, and the plastic bag was sufficiently shaken to obtain a uniformly mixed pellet. A film was manufactured in a similar manner to Example 1 except that the mixed pellet was contained in the hopper of the twin-screw kneading extruder. The content of $ZrO_2$ particle in the obtained film was 0.1% by mass based on the mixed pellet.

Example 4

In the above-described 2. (Manufacturing of Film), a PMMA pellet to which 1% by mass of $ZrO_2$ particle was added and a PMMA pellet to which $ZrO_2$ was not added were placed at a ratio of 2:98 in a plastic bag, and the plastic bag was sufficiently shaken to obtain a uniformly mixed pellet. A film was manufactured in a similar manner to Example 1 except that the mixed pellet was contained in the hopper of the twin-screw kneading extruder. The content of $ZrO_2$ particle in the obtained film was 0.02% by mass based on the mixed pellet.

Example 5

First, for inorganic particles, $ZrO_2$ particles (manufactured by Kanto Denka Kogyo Co., Ltd.) were dispersed in methanol. The particle size distribution of the $ZrO_2$ particles was measured by a dynamic light scattering method, and as the result, the median diameter was 11 nm, and the maximum particle size was 120 nm. Next, 0.1% by mass of the $ZrO_2$ particles based on the PMMA pellet were placed in a plastic bag in which the PMMA pellet (manufactured by Mitsubishi Rayon Co., Ltd., trade name: ACRYPET VH) was placed, and the plastic bag was sufficiently shaken to obtain a PMMA pellet on the surface of which $ZrO_2$ particles were uniformly adhered. A film was manufactured in a similar manner to Example 1 except that the $ZrO_2$ particle-added PMMA pellet was contained in the hopper of the twin-screw kneading extruder.

Example 6

First, for inorganic particles, barium titanate ($BaTiO_3$) particles (manufactured by Kanto Denka Kogyo Co., Ltd.) were dispersed in methanol. The particle size distribution of the $BaTiO_3$ particles was measured by a dynamic light scattering method, and as the result, the median diameter was 26 nm, and the maximum particle size was 135 nm. Next, 0.1% by mass of the $BaTiO_3$ particles based on the PMMA pellet were placed in a plastic bag in which the PMMA pellet (manufactured by Mitsubishi Rayon Co., Ltd., trade name: ACRYPET VH) was placed, and the plastic bag was sufficiently shaken to obtain a PMMA pellet on the surface of which $BaTiO_3$ was uniformly adhered. A film was manufactured in a similar manner to Example 1 except that the $BaTiO_3$ particle-added PMMA pellet was contained in the hopper of the twin-screw kneading extruder.

Example 7

A film was manufactured in a similar manner to Example 5 except that a polyethylene terephthalate pellet (manufactured by Bell Polyester Products, Inc., brand name: IPI121B) was used in place of the PMMA pellet (manufactured by Mitsubishi Rayon Co., Ltd., trade name: ACRYPET VH).

Example 8

A film was manufactured in a similar manner to Example 7 except that the addition amount of $ZrO_2$ particle was changed to 1% by mass.

Example 9

A film was manufactured in a similar manner to Example 5 except that a polycarbonate pellet (manufactured by Sumika Styron Polycarbonate Limited, brand name: SD2201W) was used in place of the PMMA pellet (manufactured by Mitsubishi Rayon Co., Ltd., trade name: ACRYPET VH).

Example 10

A film was manufactured in a similar manner to Example 9 except that the addition amount of $ZrO_2$ particle was changed to 1% by mass.

Example 11

A film was manufactured in a similar manner to Example 5 except that a polystyrene pellet (manufactured by PS JAPAN CORPORATION, brand name: HF77) was used in place of the PMMA pellet (manufactured by Mitsubishi Rayon Co., Ltd., trade name: ACRYPET VH), and that the extrusion temperature was changed to 250° C.

Example 12

A film was manufactured in a similar manner to Example except that the addition amount of $ZrO_2$ particle was changed to 1% by mass.

Example 13

A film was manufactured in a similar manner to Example except that a cellulose acetate propionate pellet (manufactured by Eastman Chemical Company, brand name: CAP-482-0.5) was used in place of the PMMA pellet (manufactured by Mitsubishi Rayon Co., Ltd., trade name: ACRYPET VH), and that the extrusion temperature was changed to 220° C.

Example 14

A film was manufactured in a similar manner to Example except that the addition amount of $ZrO_2$ particle was changed to 1% by mass.

Example 15

A film was manufactured in a similar manner to Example except that a polypropylene pellet (manufactured by SunAllomer Ltd., brand name: PL-400A) was used in place of the PMMA pellet (manufactured by Mitsubishi Rayon Co., Ltd., trade name: ACRYPET VH), and that the extrusion temperature was changed to 240° C.

Example 16

A film was manufactured in a similar manner to Example 15 except that the addition amount of $ZrO_2$ particle was changed to 1% by mass.

Example 17

A film was manufactured in a similar manner to Example 5 except that a polyethylene naphthalate pellet (manufactured by THEN LIMITED, brand name: Teonex TN-8065S) was used in place of the PMMA pellet (manufactured by Mitsubishi Rayon Co., Ltd., trade name: ACRYPET VH), and that the extrusion temperature was changed to 290° C.

Example 18

A film was manufactured in a similar manner to Example 17 except that the addition amount of $ZrO_2$ particle was changed to 1% by mass.

Example 19

A film was manufactured in a similar manner to Example 5 except that a cycloolefin polymer pellet (manufactured by Zeon Corporation, brand name: ZEONOR 1020R) was used in place of the PMMA pellet (manufactured by Mitsubishi Rayon Co., Ltd., trade name: ACRYPET VH), and that the extrusion temperature was changed to 260° C.

Example 20

A film was manufactured in a similar manner to Example 19 except that the addition amount of $ZrO_2$ particle was changed to 1% by mass.

Example 21

A film was manufactured in a similar manner to Example 5 except that a polyvinyl butyral powder (manufactured by KURARAY CO., LTD., brand name: Mowital B30H) was used in place of the PMMA pellet (manufactured by Mitsubishi Rayon Co., Ltd., trade name: ACRYPET VH), and that the extrusion temperature was changed to 170° C.

Example 22

A film was manufactured in a similar manner to Example 21 except that the addition amount of $ZrO_2$ particle was changed to 1% by mass.

Example 23

First, for inorganic particles, titanium oxide ($TiO_2$) particles (manufactured by TAYCA CORPORATION) were dispersed in methanol. The particle size distribution of the $TiO_2$ particles were measured by a dynamic light scattering method, and as the result, the median diameter was 13 nm, and the maximum particle size was 165 nm. Next, 0.3% by mass of the $TiO_2$ particles based on the PMMA pellet were placed in a plastic bag in which the PMMA pellet (manufactured by Mitsubishi Rayon Co., Ltd., trade name: ACRYPET VH) was placed, and the plastic bag was sufficiently shaken to obtain a PMMA pellet on the surface of which $TiO_2$ particles were uniformly adhered. A film was manufactured in a similar manner to Example 1 except that the $TiO_2$ particle-added PMMA pellet was contained in the hopper of the twin-screw kneading extruder.

Example 24

First, for inorganic particles, barium sulfate ($BaSO_4$) particles (manufactured by SAKAI CHEMICAL INDUSTRY CO., LTD., brand name: BF-40) were dispersed in methanol. The particle size distribution of the $BaSO_4$ particles were measured by a dynamic light scattering method, and as the result, the median diameter was 13 nm, and the maximum particle size was 265 nm. Next, 0.3% by mass of the $BaSO_4$ particles based on the PMMA pellet were placed in a plastic bag in which the PMMA pellet (manufactured by Mitsubishi Rayon Co., Ltd., trade name: ACRYPET VH) was placed, and the plastic bag was sufficiently shaken to obtain a PMMA pellet on the surface of which $BaSO_4$ particles were uniformly adhered. A film was manufactured in a similar manner to Example 1 except that the $BaSO_4$ particle-added PMMA pellet was contained in the hopper of the twin-screw kneading extruder.

Example 25

First, for inorganic particles, cerium oxide ($CeO_2$) particles were dispersed in water. The particle size distribution of the $CeO_2$ particles were measured by a dynamic light scattering method, and as the result, the median diameter was 22 nm, and the maximum particle size was 305 nm. Next, 0.3% by mass of the $CeO_2$ particles based on the PMMA pellet were placed in a plastic bag in which the PMMA pellet (manufactured by Mitsubishi Rayon Co., Ltd., trade name: ACRYPET VH) was placed, and the plastic bag was sufficiently shaken to obtain a PMMA pellet on the surface of which $CeO_2$ particles were uniformly adhered. A film was manufactured in a similar manner to Example 1 except that the $CeO_2$ particle-added PMMA pellet was contained in the hopper of the twin-screw kneading extruder.

Example 26

First, for inorganic particles, a silver nanoparticle water dispersion (manufactured by Sigma-Aldrich Japan K.K., brand name: 730785) was prepared. The particle size distribution of the silver nanoparticles in the silver nanoparticle water dispersion was measured by a dynamic light scattering method, and as the result, the median diameter was 11 nm, and the maximum particle size was 205 nm. Next, the dispersion was sprayed on a PMMA pellet (manufactured by Mitsubishi Rayon Co., Ltd., trade name: ACRYPET VH) manufactured by Mitsubishi Rayon Co., Ltd. by using a sprayer, whereby the silver nanoparticles were uniformly adhered to the surface of the PMMA pellet. The PMMA pellet on which the silver nanoparticles were sprayed was dried in a vacuum clean oven having a vacuum of 2 torr at 70° C. for 24 hours to obtain a silver nanoparticle-added PMMA pellet. The weight of the obtained silver nanoparticle-added PMMA pellet was measured, and as the result, the addition amount of the silver nanoparticles were 1% by mass based on the PMMA pellet. A film was manufactured in a similar manner to Example 1 except that the silver nanoparticle-added PMMA pellet was contained in the hopper of the twin-screw kneading extruder.

Example 27

A film for a transparent screen was manufactured in a similar manner to Example 7 except that the content of $ZrO_2$ particles (median diameter: 11 nm, maximum particle size: 120 nm) was changed to 0.15% by mass.

Example 28

A film for a transparent screen was manufactured in a similar manner to Example 7 except that the content of $ZrO_2$ particles (median diameter: 11 nm, maximum particle size: 120 nm) was changed to 0.5% by mass.

Example 29

A film was manufactured in a similar manner to Example 7 except that the thickness (before stretching) was changed to 150 μm. The manufactured unstretched film was uniaxially stretched under stretching conditions of a drawing magnification: 1.5 fold and a drawing temperature: Tg (80° C.)+20° C. to manufacture a film having a thickness of 100 μm.

Example 30

A film was manufactured in a similar manner to Example 7 except that the thickness (before stretching) was changed to 144 μm. The manufactured unstretched film was biaxially stretched under stretching conditions of a drawing magnification: 1.2×1.2 fold and a drawing temperature: Tg (80° C.)+20° C. to manufacture a film having a thickness of 100 μm.

Example 31

The $ZrO_2$ particle powder and the polyethylene terephthalate pellet used in Example 7 were mixed by using a container revolution-type mixer (manufactured by KATO-RIKI MFG. CO., LTD., KRT-50T) so that the addition amount of the $ZrO_2$ particles was 0.6% by mass. The number of revolution of the container was 30 rpm, the treatment time was 30 minutes, and a pellet on the surface of which the $ZrO_2$ particles were uniformly adhered was obtained. The obtained pellet was contained in a hopper of a single-screw kneading extruder (manufactured by GM engineering co., ltd., model number: GM50) comprising a strand die to obtain a pellet into which 0.6% by mass of $ZrO_2$ particles were kneaded. The pellet and a polyethylene terephthalate pellet (manufactured by Bell Polyester Products, Inc., trade name IPI121B) were mixed by using the container revolution-type mixer at a mass ratio of 1:5. The number of revolution of the container was 30 rpm, and the treatment time was 15 minutes. The obtained pellet was contained in a hopper of the single-screw kneading extruder comprising a T-die to manufacture a film (unstretched) having a thickness of 100 μm. The screw diameter of the single-screw kneading extruder was 50 mm, and the screw effective length (L/D) was 32. A hanger coat-type T-die was placed on the single-screw kneading extruder through an adapter. The extrusion temperature was 250° C., and the number of revolution of the screw was 30 rpm. The screw used was a screw having a full flight shape comprising a conveying element over the full length of the screw. The concentration of the $ZrO_2$ particles in the obtained film was 0.1% by mass.

Example 32

A film was manufactured in a similar manner to Example 31 except that the single-screw kneading extruder (manufactured by GM engineering co., ltd., model number: GM50) used in Example 31 was changed to a twin-screw kneading extruder (manufactured by TECHNOVEL CORPORATION, trade name: KZW-30 MG).

Comparative Example 1

A film was manufactured in a similar manner to Example 1 except that the addition amount of the $ZrO_2$ particles in the above-described 1. (Manufacturing of $ZrO_2$ particle-added PMMA pellet) was 1.5% by mass based on the PMMA pellet.

Comparative Example 2

In the above-described 2 (Manufacturing of Film), a PMMA pellet to which 1% by mass of $ZrO_2$ particles were added and a PMMA pellet to which $ZrO_2$ was not added were placed in a plastic bag at a ratio of 1:99, and the plastic bag was sufficiently shaken to obtain a uniformly mixed pellet. A film was manufactured in a similar manner to Example 1 except that the mixed pellet was contained in the hopper of the twin-screw kneading extruder. The content of the $ZrO_2$ particles in the obtained film was 0.01% by mass based on the PMMA pellet.

Comparative Example 3

$ZrO_2$ particles (manufactured by Daiichi Kigenso Kagaku Kogyo Co., Ltd., trade name: UEP zirconium oxide) were dispersed in methanol. The particle size distribution of the $ZrO_2$ particles was measured by a dynamic light scattering method, and as the result, the median diameter was 400 nm, and the maximum particle size was 1.1 μm. Next, 0.1% by mass of the $ZrO_2$ particles based on the PMMA pellet were placed in a plastic bag in which the PMMA pellet (manufactured by Mitsubishi Rayon Co., Ltd., trade name: ACRYPET VH) was placed, and the plastic bag was sufficiently shaken to obtain a PMMA pellet on the surface of which $ZrO_2$ particles were uniformly adhered. A film was manufactured in a similar manner to Example 1 except that the ZrO$_2$ particle-added PMMA pellet was contained in the hopper of the twin-screw kneading extruder.

Comparative Example 4

First, carbon black particles (manufactured by Asahi Carbon Co., Ltd., brand name: Asahi #78) were dispersed in methanol. The particle size distribution of the carbon black particles were measured by a dynamic light scattering method, and as the result, the median diameter was 23 nm, and the maximum particle size was 325 nm. Next, 0.3% by mass of the carbon black particles based on the PMMA pellet were placed in a plastic bag in which the PMMA pellet (manufactured by Mitsubishi Rayon Co., Ltd., trade name: ACRYPET VH) was placed, and the plastic bag was sufficiently shaken to obtain a PMMA pellet on the surface of which carbon black particles were uniformly adhered. A film was manufactured in a similar manner to Example 1 except that the carbon black particle-added PMMA pellet was contained in the hopper of the twin-screw kneading extruder.

Comparative Example 5

First, carbon black particles (manufactured by Asahi Carbon Co., Ltd., brand name: SB935) were dispersed in methanol. The particle size distribution of the carbon black particles were measured by a dynamic light scattering method, and as the result, the median diameter was 13 nm, and the maximum particle size was 225 nm. Next, 0.3% by mass of the carbon black particles based on the PMMA pellet were placed in a plastic bag in which the PMMA pellet (manufactured by Mitsubishi Rayon Co., Ltd., trade name: ACRYPET VH) was placed, and the plastic bag was sufficiently shaken to obtain a PMMA pellet on the surface of which carbon black particles were uniformly adhered. A film was manufactured in a similar manner to Example 1 except that the carbon black particle-added PMMA pellet was contained in the hopper of the twin-screw kneading extruder.

Comparative Example 6

A film for a transparent screen was manufactured in a similar manner to Example 7 except that 0.15% by mass of silica particles (median diameter: 3000 nm, maximum particle size: 4200 nm) were added in place of the ZrO$_2$ particles (median diameter: 11 nm, maximum particle diameter: 120 nm).

Comparative Example 7

A film for a transparent screen was manufactured in a similar manner to Example 7 except that 0.15% by mass of acrylic resin microparticles (median diameter: 3000 nm, maximum particle diameter: 3600 nm) were added in place of the ZrO$_2$ particles (median diameter: 11 nm, maximum particle diameter: 120 nm).

Comparative Example 8

A film for a transparent screen was manufactured in a similar manner to Comparative Example 6 except that the content of the silica particles (median diameter: 3000 nm, maximum particle size: 4200 nm) was changed to 0.5% by mass.

Comparative Example 9

A film for a transparent screen was manufactured in a similar manner to Comparative Example 7 except that the content of the acrylic resin microparticles (median diameter: 3000 nm, maximum particle size: 3600 nm) was changed to 0.5% by mass.

Comparative Example 10

A film for a transparent screen was manufactured in a similar manner to Example 7 except that the content of the ZrO$_2$ particles (median diameter: 11 nm, maximum particle diameter: 120 nm) was changed to 0.01% by mass.

Comparative Example 11

A film for a transparent screen was manufactured in a similar manner to Example 7 except that the content of the ZrO$_2$ particles (median diameter: 11 nm, maximum particle diameter: 120 nm) was changed to 1.8% by mass.

Comparative Example 12

A film for a transparent screen was manufactured in a similar manner to Example 7 except that 0.15% by mass of ZrO$_2$ particles (median diameter: 400 nm, maximum particle size: 1100 nm) were added in place of the ZrO$_2$ particles (median diameter: 11 nm, maximum particle diameter: 120 nm).

<Evaluation of Film for Transparent Screen>

The optical property of the film manufactured in the above-described Examples and Comparative Examples was evaluated in the following manner. First, the transparency of the film was evaluated by visual inspection based on the following criteria. The evaluation results are listed on Table 2.

[Evaluation Criteria]
○: The film was transparent.
x: The film was clouded, and had a poor transparency.
x x: The film was grayish, and had a very poor transparency.

Next, the total light transmittance (%), the parallel beam transmittance (%), and the haze (%) of the film was measured by using a haze meter (manufactured by NIPPON DENSHOKU INDUSTRIES CO., LTD., trade name: NDH-5000) in accordance with JIS-K-7361 and JIS-K-7136. The value of definition (%) measured by using an image clarity meter (manufactured by Suga Test Instruments Co., Ltd., product number: ICM-1T) with an optical comb width of 0.125 mm in accordance with JIS K7374 was defined as an image clarity. The larger the value of the definition is, the higher the transmission image clarity is. The measurement results are listed on Table 2.

<Manufacturing of Transparent Screen and Evaluation the Transparent Screen>

As a transparent screen, the film manufactured in the above-described Examples and Comparative Examples was placed at a position 50 cm away from an image projection lens of a mobile LED mini projector (manufactured by Onkyo Digital Solutions Co., Ltd., trade name: PP-D1S). Next, a focus knob of the projector was adjusted so that the focus was located on the screen. Subsequently, an image was projected on the screen from two positions 1 m backward obliquely at an angle of 45° from the screen and 1 m frontward obliquely at an angle of 45° from the screen. The image visibility on the screen was evaluated by visual inspection based on the following criteria. The evaluation results are listed on Table 2.

[Evaluation Criteria]
○: An image on the screen was clear, and the film was suitable for a transparent screen.
x: An image on the screen was unclear, and the film was not suitable for a transparent screen.

Details of the inorganic particles and the resin used in Examples and Comparative Examples are listed on Table 1.

The results of the evaluation described above are listed on Table 2.

TABLE 1

| | | Inorganic particle | | | |
|---|---|---|---|---|---|
| | Type | Median diameter (nm) | Maximum particle size (nm) | Content (% by mass) | Resin Type |
| Example 1 | Zirconium oxide | 2 | 23 | 1 | Acrylic |
| Example 2 | Zirconium oxide | 2 | 23 | 0.5 | Acrylic |
| Example 3 | Zirconium oxide | 2 | 23 | 0.1 | Acrylic |
| Example 4 | Zirconium oxide | 2 | 23 | 0.02 | Acrylic |
| Example 5 | Zirconium oxide | 11 | 120 | 0.1 | Acrylic |
| Example 6 | Barium titanate | 26 | 135 | 0.1 | Acrylic |
| Example 7 | Zirconium oxide | 11 | 120 | 0.1 | Polyester |
| Example 8 | Zirconium oxide | 11 | 120 | 1 | Polyester |
| Example 9 | Zirconium oxide | 11 | 120 | 0.1 | Polycarbonate |
| Example 10 | Zirconium oxide | 11 | 120 | 1 | Polycarbonate |
| Example 11 | Zirconium oxide | 11 | 120 | 0.1 | Polystyrene |
| Example 12 | Zirconium oxide | 11 | 120 | 1 | Polystyrene |
| Example 13 | Zirconium oxide | 11 | 120 | 0.1 | Cellulose |
| Example 14 | Zirconium oxide | 11 | 120 | 1 | Cellulose |
| Example 15 | Zirconium oxide | 11 | 120 | 0.1 | Polyolefin |
| Example 16 | Zirconium oxide | 11 | 120 | 1 | Polyolefin |
| Example 17 | Zirconium oxide | 11 | 120 | 0.1 | Polyester |
| Example 18 | Zirconium oxide | 11 | 120 | 1 | Polyester |
| Example 19 | Zirconium oxide | 11 | 120 | 0.1 | Polyolefin |
| Example 20 | Zirconium oxide | 11 | 120 | 1 | Polyolefin |
| Example 21 | Zirconium oxide | 11 | 120 | 0.1 | Vinyl |
| Example 22 | Zirconium oxide | 11 | 120 | 1 | Vinyl |
| Example 23 | Titanium oxide | 13 | 165 | 0.3 | Acrylic |
| Example 24 | Barium sulfate | 13 | 265 | 0.3 | Acrylic |
| Example 25 | Cerium oxide | 22 | 305 | 0.3 | Acrylic |
| Example 26 | Silver | 11 | 205 | 1 | Acrylic |
| Example 27 | Zirconium oxide | 11 | 120 | 0.15 | Polyester |
| Example 28 | Zirconium oxide | 11 | 120 | 0.5 | Polyester |
| Example 29 | Zirconium oxide | 11 | 120 | 0.1 | Polyester |
| Example 30 | Zirconium oxide | 11 | 120 | 0.1 | Polyester |
| Example 31 | Zirconium oxide | 11 | 120 | 0.1 | Polyester |
| Example 32 | Zirconium oxide | 11 | 120 | 0.1 | Polyester |
| Comparative Example 1 | Zirconium oxide | 2 | 23 | 1.5 | Acrylic |
| Comparative Example 2 | Zirconium oxide | 2 | 23 | 0.01 | Acrylic |
| Comparative Example 3 | Zirconium oxide | 400 | 1100 | 0.1 | Acrylic |
| Comparative Example 4 | Carbon black | 23 | 325 | 0.3 | Acrylic |
| Comparative Example 5 | Carbon black | 13 | 225 | 0.3 | Acrylic |
| Comparative Example 6 | Silica | 3000 | 4200 | 0.15 | Polyester |
| Comparative Example 7 | Acrylic resin | 3000 | 3600 | 0.15 | Polyester |
| Comparative Example 8 | Silica | 3000 | 4200 | 0.5 | Polyester |
| Comparative Example 9 | Acrylic resin | 3000 | 3600 | 0.5 | Polyester |
| Comparative Example 10 | Zirconium oxide | 11 | 120 | 0.01 | Polyester |
| Comparative Example 11 | Zirconium oxide | 11 | 120 | 1.8 | Polyester |
| Comparative Example 12 | Zirconium oxide | 400 | 1100 | 0.15 | Polyester |

TABLE 2

| | Film | | | | | | |
|---|---|---|---|---|---|---|---|
| | Thickness (μm) | Total light transmittance (%) | Parallel light transmittance (%) | Haze (%) | Transparency | Image clarity (%) | Screen Image visibility |
| Example 1 | 100 | 91.56 | 66.92 | 26.91 | ○ | 77 | ○ |
| Example 2 | 100 | 91.70 | 71.79 | 21.71 | ○ | 86 | ○ |
| Example 3 | 100 | 92.27 | 84.61 | 8.30 | ○ | 90 | ○ |

TABLE 2-continued

| | Film | | | | | | |
|---|---|---|---|---|---|---|---|
| | Thickness (μm) | Total light transmittance (%) | Parallel light transmittance (%) | Haze (%) | Transparency | Image clarity (%) | Screen Image visibility |
| Example 4 | 100 | 92.38 | 89.88 | 2.71 | ○ | 93 | ○ |
| Example 5 | 100 | 92.37 | 85.43 | 7.51 | ○ | 90 | ○ |
| Example 6 | 100 | 92.16 | 85.05 | 7.71 | ○ | 79 | ○ |
| Example 7 | 100 | 91.42 | 83.43 | 8.74 | ○ | 90 | ○ |
| Example 8 | 100 | 90.02 | 65.43 | 27.32 | ○ | 76 | ○ |
| Example 9 | 100 | 90.42 | 82.43 | 8.84 | ○ | 89 | ○ |
| Example 10 | 100 | 88.82 | 63.43 | 28.59 | ○ | 76 | ○ |
| Example 11 | 100 | 90.92 | 82.73 | 9.01 | ○ | 89 | ○ |
| Example 12 | 100 | 88.89 | 63.49 | 28.57 | ○ | 77 | ○ |
| Example 13 | 100 | 88.92 | 80.73 | 9.21 | ○ | 88 | ○ |
| Example 14 | 100 | 88.89 | 63.49 | 28.57 | ○ | 75 | ○ |
| Example 15 | 80 | 83.92 | 73.73 | 12.14 | ○ | 79 | ○ |
| Example 16 | 80 | 80.89 | 55.02 | 31.98 | ○ | 71 | ○ |
| Example 17 | 80 | 83.72 | 73.79 | 11.86 | ○ | 90 | ○ |
| Example 18 | 80 | 81.89 | 63.02 | 23.04 | ○ | 76 | ○ |
| Example 19 | 80 | 90.72 | 82.79 | 8.84 | ○ | 91 | ○ |
| Example 20 | 80 | 89.04 | 69.62 | 21.81 | ○ | 78 | ○ |
| Example 21 | 80 | 88.71 | 81.79 | 7.80 | ○ | 79 | ○ |
| Example 22 | 80 | 87.11 | 64.62 | 25.52 | ○ | 70 | ○ |
| Example 23 | 100 | 88.37 | 77.22 | 12.62 | ○ | 78 | ○ |
| Example 24 | 100 | 88.09 | 77.01 | 12.58 | ○ | 73 | ○ |
| Example 25 | 100 | 87.77 | 76.21 | 13.17 | ○ | 73 | ○ |
| Example 26 | 100 | 91.36 | 68.59 | 27.11 | ○ | 74 | ○ |
| Example 27 | 100 | 89.81 | 83.33 | 7.21 | ○ | 88 | ○ |
| Example 28 | 100 | 89.34 | 70.53 | 21.05 | ○ | 85 | ○ |
| Example 29 | 100 | 91.42 | 83.43 | 8.74 | ○ | 90 | ○ |
| Example 30 | 100 | 91.42 | 83.43 | 8.74 | ○ | 90 | ○ |
| Example 31 | 100 | 91.42 | 83.43 | 8.74 | ○ | 90 | ○ |
| Example 32 | 100 | 91.42 | 83.43 | 8.74 | ○ | 90 | ○ |
| Comparative Example 1 | 100 | 90.84 | 54.58 | 39.92 | X | 63 | X |
| Comparative Example 2 | 100 | 92.40 | 91.46 | 1.02 | ○ | 94 | X |
| Comparative Example 3 | 100 | 91.08 | 57.33 | 37.06 | X | 63 | X |
| Comparative Example 4 | 100 | 75.41 | 55.11 | 26.91 | XX | 44 | X |
| Comparative Example 5 | 100 | 76.44 | 55.93 | 26.83 | XX | 48 | X |
| Comparative Example 6 | 100 | 89.63 | 85.55 | 4.55 | ○ | 29 | ○ |
| Comparative Example 7 | 100 | 89.80 | 83.61 | 6.89 | ○ | 61 | ○ |
| Comparative Example 8 | 100 | 88.32 | 78.59 | 11.02 | ○ | 19 | ○ |
| Comparative Example 9 | 100 | 88.43 | 71.84 | 18.76 | ○ | 41 | ○ |
| Comparative Example 10 | 100 | 90.17 | 89.39 | 0.86 | ○ | 89 | X |
| Comparative Example 11 | 100 | 88.55 | 54.75 | 38.17 | X | 63 | ○ |
| Comparative Example 12 | 100 | 88.74 | 84.44 | 4.84 | ○ | 62 | ○ |

DESCRIPTION OF SYMBOLS

10 Film for transparent screen
11 Resin layer
12 Inorganic particle
20 Film for transparent screen
21 Resin layer
22 Protection layer
23 Backing layer
24 Adhesive layer
30 Film for transparent screen
31 Transparent partition
32 Transparent screen
33 Observer
34A, 34B Projection device
35A, 35B Projection light
36A, 36B Diffused light

The invention claimed is:

1. A film for a transparent screen comprising:

a resin layer; and inorganic particles at least a portion of which is contained in an aggregated state in the resin layer, wherein primary particles of the inorganic particles have a median diameter of 0.1 to 50 nm and primary particles of the inorganic particles have a maximum particle size of 10 to 500 nm, the content of the inorganic particles is 0.015 to 1.2% by mass with respect to the resin, and the film for a transparent screen has a total light transmittance of 70% of higher, the haze value thereof is from 1.3% to 35%, and the image clarity thereof is 70% or higher.

2. The film for a transparent screen according to claim 1, wherein
the inorganic particles are metal particles.

3. The film for a transparent screen according to claim 1, wherein
the inorganic particles are at least one selected from the group consisting of zirconium oxide particles, titanium oxide particles, cerium oxide particles, barium titanate particles, barium sulfate particles, and silver particles.

4. The film for a transparent screen according to claim 1, wherein
the resin layer comprises a thermoplastic resin.

5. The film for a transparent screen according to claim 4, wherein
the thermoplastic resin comprises at least one selected from the group consisting of an acrylic resin, a polyester resin, a polyolefin resin, a cellulose resin, a vinyl resin, a polycarbonate resin, and a polystyrene resin.

6. The film for a transparent screen according to claim 4, wherein
the thermoplastic resin comprises at least one selected from the group consisting of a polymethyl methacrylate resin, a polyethylene terephthalate resin, a polyethylene naphthalate resin, a polypropylene resin, a cycloolefin polymer resin, a cellulose acetate propionate resin, a polyvinyl butyral resin, a polycarbonate resin, and a polystyrene resin.

7. The film for a transparent screen according to claim 1, wherein
the total light transmittance of the film for a transparent screen is 75% or higher, and the haze value thereof is from 1.5% to 30%.

8. The film for a transparent screen according to claim 1, wherein
the image clarity of the film for a transparent screen is 80% or higher.

9. The film for a transparent screen according to claim 1, wherein
the thickness of the resin layer is from 20 to 400 μm.

10. A transparent screen comprising the film for a transparent screen according to claim 1.

11. A layered body comprising the transparent screen according to claim 10.

12. A member for a vehicle comprising the transparent screen according to claim 10.

13. A member for a house comprising the transparent screen according to claim 10.

14. An image projection device comprising the transparent screen according to claim 10 and a projection device.

15. A method for manufacturing the film for a transparent screen according to claim 1, comprising:
a step of kneading the resin and the inorganic particles by using a twin-screw kneading extruder while applying a shear stress of 3 to 1,800 kPa on average over the whole length of a screw of the twin-screw kneading extruder to obtain a resin composition; and
a step of forming a film made of the resin composition, wherein
the twin-screw kneading extruder comprises a flight screw including at least one mixing and kneading element selected from the group consisting of a kneading element, a mixing element, and a rotary element.

16. A method for manufacturing the film for a transparent screen according to claim 1, comprising:
a step of mixing the inorganic particles and the resin to obtain an inorganic particle-attached resin composition;
a step of kneading the inorganic particle-attached resin composition and the resin to obtain an inorganic particle-dispersed resin composition; and
a step of forming a film made of the inorganic particle-dispersed resin composition.

17. The method for manufacturing a film for a transparent screen according to claim 16, wherein
the step of kneading and/or the process of forming a film are performed by using a single- or twin-screw kneading extruder.

* * * * *